US007864053B2

(12) United States Patent
August et al.

(10) Patent No.: US 7,864,053 B2
(45) Date of Patent: Jan. 4, 2011

(54) VISIBILITY RADIO CAP AND NETWORK

(75) Inventors: Jason August, Toronto (CA); John Stevens, Stratham, NH (US); Paul Waterhouse, Copetown (CA)

(73) Assignee: Visible Assets, Inc., Mississauga, Ontario (CA)

( * ) Notice: Subject to any disclaimer, the term of this patent is extended or adjusted under 35 U.S.C. 154(b) by 298 days.

(21) Appl. No.: 12/048,181

(22) Filed: Mar. 13, 2008

(65) Prior Publication Data

US 2008/0218348 A1 Sep. 11, 2008

Related U.S. Application Data

(63) Continuation-in-part of application No. 11/402,413, filed on Apr. 12, 2006, now abandoned.

(51) Int. Cl.
*G08B 13/14* (2006.01)
(52) U.S. Cl. .............. 340/572.1; 340/572.4; 340/572.8; 340/5.8; 235/487; 235/375; 235/385; 726/2; 705/22
(58) Field of Classification Search .............. 340/572.1, 340/572.4, 572.8, 572.7, 505, 539.22, 539.26, 340/825.36, 10.1, 5.8; 235/494, 487, 385, 235/380, 382.5, 383; 726/2; 380/277; 705/2, 705/22, 67, 72, 17, 58
See application file for complete search history.

(56) References Cited

U.S. PATENT DOCUMENTS

| | | | |
|---|---|---|---|
| 4,190,830 A | 2/1980 | Bell | |
| 4,750,197 A | 6/1988 | Denekamp et al. | |
| 4,792,796 A | 12/1988 | Bradshaw et al. | |
| 4,821,291 A | 4/1989 | Stevens et al. | |
| 4,879,756 A | 11/1989 | Stevens et al. | |
| 4,937,586 A | 6/1990 | Stevens et al. | |
| 4,961,028 A | 10/1990 | Tanaka | |
| 5,177,432 A | 1/1993 | Waterhouse et al. | |
| 5,245,534 A | 9/1993 | Waterhouse et al. | |
| 5,260,694 A | 11/1993 | Remahl | |
| 5,374,815 A | 12/1994 | Waterhouse et al. | |
| 5,517,188 A | 5/1996 | Carroll et al. | |
| 5,519,381 A | 5/1996 | March et al. | |
| 5,532,465 A | 7/1996 | Waterhouse et al. | |
| 5,774,876 A | 6/1998 | Woolley et al. | |
| 5,861,817 A | 1/1999 | Palmer et al. | |
| 5,920,287 A | 7/1999 | Belcher et al. | |
| 5,924,739 A * | 7/1999 | Garbutt ....................... 283/81 |
| 5,969,595 A | 10/1999 | Schipper et al. | |
| 6,127,976 A | 10/2000 | Boyd et al. | |
| 6,195,006 B1 | 2/2001 | Bowers et al. | |

(Continued)

FOREIGN PATENT DOCUMENTS

WO 2006035401 A2 4/2006

*Primary Examiner*—Toan N Pham
(74) *Attorney, Agent, or Firm*—Larson & Anderson, LLC

(57) ABSTRACT

A pedigree tag for tracking and validating authenticity of contents in a container includes: a radio frequency modem operable at a low radio frequency, not exceeding one megahertz, and including a full duplex transmitter and receiver; an antenna operatively coupled with the radio frequency modem; a programmable microprocessor operatively coupled with the radio frequency modem; a memory operatively coupled with the programmable microprocessor; a clock; and a connector for connecting a power source for providing power to the microprocessor; wherein the pedigree tag is in a form factor conformable to the container to which it is affixed.

13 Claims, 15 Drawing Sheets

U.S. PATENT DOCUMENTS

| | | |
|---|---|---|
| 6,236,911 B1 | 5/2001 | Krueger et al. |
| 6,280,544 B1 | 8/2001 | Fox et al. |
| 6,294,997 B1 | 9/2001 | Paratore et al. |
| 6,318,636 B1 | 11/2001 | Reynolds et al. |
| 6,329,944 B1 | 12/2001 | Richardson et al. |
| 6,354,493 B1 | 3/2002 | Mon |
| 6,373,389 B1 | 4/2002 | Przygoda et al. |
| 6,377,203 B1 | 4/2002 | Doany |
| 6,452,340 B1 | 9/2002 | Morrissey et al. |
| 6,496,806 B1 | 12/2002 | Horwitz et al. |
| 6,512,478 B1 | 1/2003 | Chien |
| 6,552,663 B2 | 4/2003 | Swartzel et al. |
| 6,608,551 B1 | 8/2003 | Anderson et al. |
| 6,641,052 B2 * | 11/2003 | Baillod et al. ............... 235/494 |
| 6,720,883 B2 | 4/2004 | Kuhr et al. |
| 6,724,308 B2 | 4/2004 | Nicholson |
| 6,745,027 B2 | 6/2004 | Twitchell et al. |
| 6,927,687 B2 | 8/2005 | Carrender et al. |
| 7,028,861 B2 | 4/2006 | Sayers et al. |
| 7,034,683 B2 | 4/2006 | Ghazarian |
| 7,049,963 B2 * | 5/2006 | Waterhouse et al. ..... 340/572.1 |
| 7,138,920 B2 | 11/2006 | Nyfelt |
| 7,152,040 B1 | 12/2006 | Hawthorne et al. |
| 7,156,305 B2 * | 1/2007 | Swan et al. ................. 235/385 |
| 7,164,359 B2 | 1/2007 | Waterhouse et al. |
| 7,173,530 B2 | 2/2007 | Lambright et al. |
| 7,283,036 B2 | 10/2007 | Chen |
| 7,327,250 B2 | 2/2008 | Harvey |
| 7,350,655 B2 * | 4/2008 | Belden, Jr. .................. 215/215 |
| 7,537,157 B2 * | 5/2009 | Silverbrook et al. ........ 235/385 |
| 2002/0057191 A1 | 5/2002 | Bates et al. |
| 2004/0053641 A1 | 3/2004 | Leung et al. |
| 2004/0069849 A1 | 4/2004 | Stevens et al. |
| 2004/0145474 A1 | 7/2004 | Schmidtberg et al. |
| 2004/0149822 A1 | 8/2004 | Stevens et al. |
| 2004/0205350 A1 | 10/2004 | Waterhouse et al. |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0083213 A1 | 4/2005 | Stevens et al. |
| 2005/0086983 A1 | 4/2005 | Stevens et al. |
| 2005/0122221 A1 | 6/2005 | Chuang et al. |
| 2005/0134461 A1 | 6/2005 | Gelbman et al. |
| 2005/0149226 A1 | 7/2005 | Stevens et al. |
| 2005/0205670 A1 | 9/2005 | Natori et al. |
| 2005/0205817 A1 | 9/2005 | Marcichow et al. |
| 2005/0251330 A1 | 11/2005 | Waterhouse et al. |
| 2006/0124662 A1 | 6/2006 | Reynolds et al. |
| 2006/0128023 A1 | 6/2006 | Waterhouse et al. |
| 2006/0164232 A1 | 7/2006 | Waterhouse et al. |
| 2006/0220857 A1 | 10/2006 | August et al. |
| 2006/0232417 A1 | 10/2006 | August et al. |
| 2007/0080805 A1 | 4/2007 | Franklin et al. |
| 2007/0285238 A1 | 12/2007 | Batra |
| 2008/0198014 A1 * | 8/2008 | Vogt et al. ................. 340/572.1 |
| 2010/0116069 A1 | 5/2010 | Schmiedl |

* cited by examiner

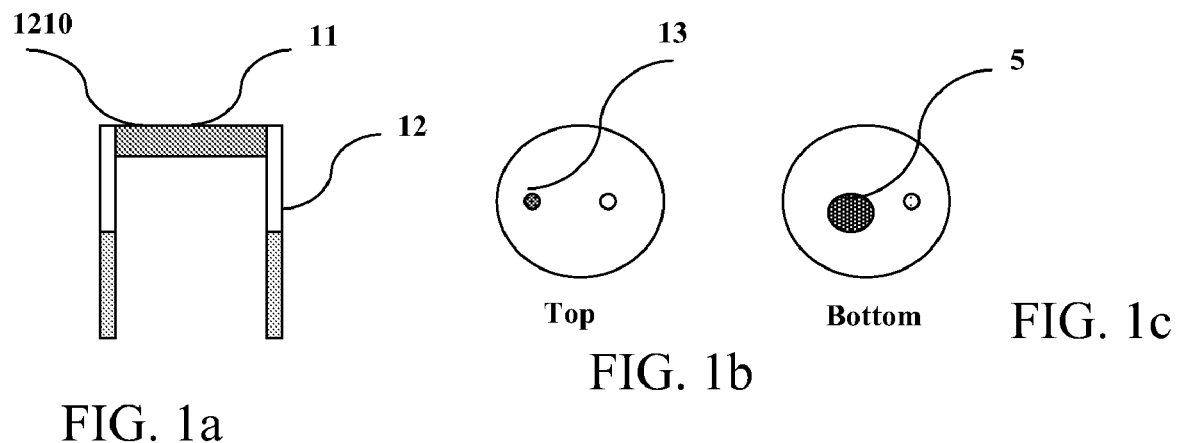
FIG. 1a
FIG. 1b
FIG. 1c
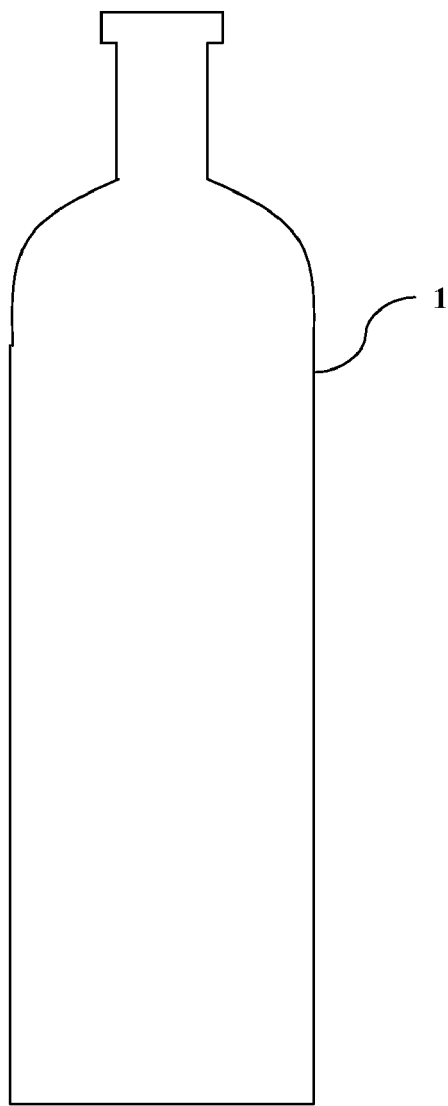
FIG. 1d

900

Wine Management Network

| | |
|---|---|
| Tag Read | 123456 |
| Chateau Momosom | |
| Vintage | 2002 |
| Temp Min | 15 C |
| Temp Max | 18 C |
| Jog Index | Low |
| Pick Date | 6/06/2002 |
| Bottle Date | 7/06/2003 |
| Purchase Date | 7/06/2005 |
| ContentCertified | Yes |
| Save to Database? | X |
| Open Bottle? | X |

*FIG. 10*

John Smith
123 Main Road
Boston, Massachusetts

Chateau Momosom

| | |
|---|---|
| Vintage | 2002 |
| Temp Min | 15 C |
| Temp Max | 18 C |
| Jog Index | Low |
| Pick Date | 6/06/2002 |
| Bottle Date | 7/06/2003 |
| Purchase Date | 7/06/2005 |
| ContentCertified | Yes |
| Inventory | 4 |
| Bottle Opened | 06/06/2007 |
| See History | X |

*FIG. 11*

VISIBILITY RADIO CAP AND NETWORK

CROSS-REFERENCE TO RELATED APPLICATIONS

This application is a continuation-in-part of, and claims priority from, commonly-owned, U.S. application Ser. No. 11/402,413, "Active Radiating, Low Frequency Sensor Tag and System," filed Apr. 12, 2006, now abandoned which is incorporated by reference as if fully set forth herein.

INCORPORATION BY REFERENCE OF MATERIAL SUBMITTED ON A COMPACT DISC

None.

TRADEMARKS

RuBee™ is a registered trademark of Visible Assets, Inc. of Canada. Other names used herein may be registered trademarks, trademarks or product names of Visible Assets, Inc. or other companies.

FIELD OF THE INVENTION

The invention disclosed broadly relates to the field of consumer fraud prevention and more particularly relates to the field of authenticating the contents of containers.

BACKGROUND OF THE INVENTION

Consumer fraud takes many forms. One such form is counterfeiting spirits; in particular, fine wines, rare cognac, and whiskey. Counterfeited spirits are very difficult to detect and many consumers end up paying upwards of $500 per bottle for cheap imitations. It is relatively easy for a counterfeiter to acquire a bottle of fine wine or rare cognac, perhaps legitimately purchased, consume the contents, then refill the same bottle with a cheaper drink, cork it and sell it to an unsuspecting consumer. Some spirits are diluted with water or blended with wood alcohol.

In the fine wine secondary market, a potential buyer will examine the bottle and label to determine authenticity. Therein lies the problem, for the bottle and label could very well be authentic, yet the contents may be a cheap substitute. The ease of counterfeiting spirits, combined with the difficulty of authenticating the pedigree of the spirits, has contributed to a growing problem in the wine industry. Consider this pronouncement from www.wine-searcher.com/fakes.lml: "Some experts estimate that as much as 5% of the fine wine secondary market involves counterfeit wines. Pointers to the extent of the problem are that the volume of 1947 first growths sold in the last few years has exceeded that whole year's production."

In many cases, the seller of counterfeit spirits portrays a person who has inherited a rare bottle of wine or spirit, and just wants to sell it for a fair price. Even reputed experts are being burned by these counterfeiters, leading to a growing concern over the sheer numbers involved. Consider this article written in 1998: "A Taste of Deception, an exclusive look at counterfeit wine—a multimillion-dollar business," by James Suckling, May 31, 1998, a portion of which states: "For years, producers, merchants and collectors have been whispering about the growing number of counterfeits in tastings, auctions, restaurants and shops worldwide. Anyone who seriously trades in the best Bordeaux and Burgundies has stories about phony bottles. They have all been burned on occasion. Today, some believe that wine counterfeiting could be an internationally organized, multimillion-dollar crime. The FBI and New Scotland Yard have been investigating a number of fine wine merchants on both sides of the Atlantic in regard to the sales of bogus bottles, particularly cases of '82 Pètrus.

'The genuine bottles are awash in fakes,' said Serena Sutcliffe, head of the wine department of Sotheby's auction house. 'For example, there are loads of '47s being drunk that are fake. . . . I am convinced that we are talking about big, big figures when it comes to counterfeited wines each year. We are talking about millions and millions of dollars over the last few years.'"

The wine industry has taken note. Some attempts to fight this fraud include: placing serial numbers on each bottle; requiring restaurants and bars to destroy bottles and labels before discarding; and placing radio frequency identification (RFID) tags in the cork. None of these measures have proven effective. Checking the serial numbers on bottles for a duplicate sale requires access to an up-to-date database and this is rarely possible. RFID tags may be easily replicated or cloned and they also require interaction with an up-to-date database. Restaurant and bar workers are often too busy to take on the additional tasks of properly destroying bottles and labels.

There is a need for a system and method to easily validate the authenticity of consumer products such as spirits.

SUMMARY OF THE INVENTION

Briefly, according to an embodiment of the present invention, we describe a pedigree tag for tracking and validating authenticity of contents in a container that includes: a radio frequency modem operable at a low radio frequency not exceeding one megahertz and including a full duplex transmitter and receiver; a loop antenna operatively coupled with the radio frequency modem; a programmable microprocessor operatively coupled with the radio frequency modem; a memory operatively coupled with the programmable microprocessor; a clock; and a connector for connecting a power source for providing power to the microprocessor; wherein the pedigree tag is in a form factor conformable to the container to which it is affixed.

The pedigree tag may be made into different form factors in order to fit unobtrusively either within or outside of a container, such as a bottle. We describe form factors to fit on top of a bottle, encompassing a bottle top, underneath a cork, and underneath the bottle.

The pedigree tag may contain optional sensors such as jog sensors, temperature sensors, and light sensors. Additionally, a display can be provided for presenting visually identifiable data about the contents of a bottle.

According to an embodiment of the present invention, a pedigree visibility network includes a plurality of containers with pedigree tags affixed to them; a base station configured for transmission of signals to and from the plurality of pedigree tags; a computer in communication with the base station; and a graphical user interface for enabling a user to read and write data to be transmitted to and from the plurality of pedigree tags.

According to another embodiment of the present invention, a method for enabling a pedigree tag visibility network includes steps or acts of: initializing a pedigree tag with a unique identifier and a network identifier; affixing the pedigree tag onto a container, depending on its form factor; transmitting data to the pedigree tag; monitoring data recorded by the pedigree tag; and deactivating the pedigree tag. The pedigree tag may be automatically deactivated upon removal and/or sensor alert; or the pedigree tag may be deactivated remotely by software.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1a is a simplified illustration of the p-tag, according to an embodiment of the present invention;

FIG. 1b is an illustration of the top of the p-tag, according to an embodiment of the present invention;

FIG. 1c is an illustration of the bottom of the p-tag, according to an embodiment of the present invention;

FIG. 1d is an illustration of a bottle representing a standard form factor for a bottle of spirits.

FIG. 10 is an illustration of data read from a tag that would be of interest to a consumer, according to an embodiment of the present invention;

FIG. 11 is an illustration of data read from a tag that would be of interest to a producer, according to an embodiment of the present invention;

Figure 2:
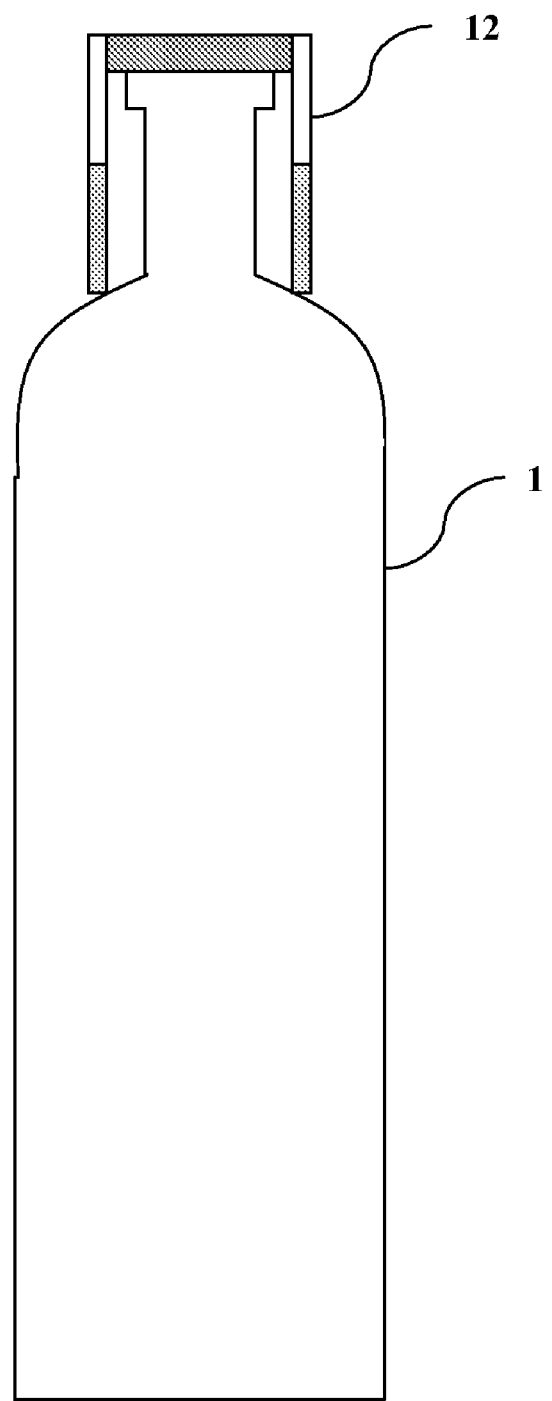
FIG. 2 is a simplified illustration of a p-tag placed on a bottle, according to an embodiment of the present invention.

While the invention can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system and method for tracking and validating the authenticity of contents in a container. For clarity, the discussion to follow will focus on the invention as applied to bottles of spirits, but it should be noted that the invention as described is applicable to other containers and contents.

A system according to an embodiment of the invention uses a RuBee tag disposed on a bottle as part of a visibility network. We refer to this tag as a pedigree tag, or "p-tag." A visibility network is described in U.S. Provisional Patent Ser. No. 60/887,869, "Visibility Cart Tracking and Dispensing System for Medical Products."

The p-tag visibility network can be used to: 1) guarantee the pedigree of wine, as well as other alcoholic beverages (e.g. whisky, vodkas, scotch, brandy), verifying that it has not been opened or tampered with since production; and 2) provide a certified pedigree to the consumer that proves provenance, as well as a temperature log, and confirmation that the contents have not been compromised. For example, wine should never be shaken. A jog sensor located inside the p-tag could detect and report if a wine bottle had been shaken.

In addition, the p-tag visibility network also provides valuable point of use data to the producer of the product. The consumer is mostly concerned with guaranteeing the pedigree and proving provenance of the product, but in order to obtain that assurance, the consumer relies on the producer to obtain point of use data. This in turn provides the producer with new sales and marketing opportunities as a result of this improved ability to provide valuable point of use data. The p-tag visibility network also provides an excellent inventory management system.

The RuBee™ system as described in U.S. patent application Ser. No. 11/402,413, "Active Radiating, Low Frequency Sensor Tag and System," is a low frequency transmission protocol. Unlike radio frequency identification (RFID), RuBee™ transmissions are not affected by liquids and can tune surrounding steel or other conductive materials into an antenna. RuBee combines a radio tag in a networked system that provides the benefits described above. RuBee tags can be optimized with sensors and displays. A RuBee™ tag is the major component of the p-tag.

Background on RuBee™ Radio Tags.

Radio tags communicate via magnetic (inductive communication) or electric radio communication to a base station or reader, or to another radio tag. A RuBee™ radio tag works through water and other bodily fluids, and near steel, with an eight to fifteen foot range, a five to ten-year battery life, and three million reads/writes. It operates at 132 Khz and is a full on-demand peer-to-peer, radiating transceiver.

RuBee™ is a bidirectional, on-demand, peer-to-peer transceiver protocol operating at wavelengths below 450 Khz (low frequency). A transceiver is a radiating radio tag that actively receives digital data and actively transmits data by providing power to an antenna. A transceiver may be active or passive. The RuBee™ standard is documented in the IEEE Standards body as IEEE P1902.1™.

Low frequency (LF), active radiating transceiver tags are especially useful for visibility and for tracking both inanimate and animate objects with large area loop antennas over other more expensive active radiating transponder high frequency (HF)/ultra high frequency (UHF) tags. These LF tags function well in harsh environments, near water and steel, and may have full two-way digital communications protocol, digital static memory and optional processing ability, sensors with memory, and ranges of up to 100 feet. The active radiating transceiver tags can be far less costly than other active transceiver tags (many under one dollar), and often less costly than passive back-scattered transponder RFID tags, especially those that require memory and make use of EEPROM. With an optional on-board crystal, these low frequency radiating transceiver tags also provide a high level of security by providing a date-time stamp, making full AES (Advanced Encryption Standard) encryption and one-time pad ciphers possible.

One of the advantages of the RuBee™ tags is that they can transmit well through water and near steel. This is because RuBee™ operates at a low frequency. Low frequency radio tags are immune to nulls often found near steel and liquids, as in high frequency and ultra high-frequency tags. This makes them ideally suited for use with containers holding liquids that may be stored on or near steel shelving. Fluids have posed significant problems for current tags. The RuBee™ tag works well through water. In fact, tests have shown that the RuBee™ tags work well even when fully submerged in water. This is not true for any frequency above 1 MHz. Radio signals in the 13.56 MHz range have losses of over 50% in signal strength as a result of water, and anything over 30 MHz have losses of 99%.

Another advantage is that RuBee™ tags can be networked. One tag is operable to send and receive radio signals from another tag within the network or to a reader. The reader itself is operable to receive signals from all of the tags within the network. These networks operate at long-wavelengths and accommodate low-cost radio tags at ranges to 100 feet. The standard, IEEE P1902.1™, "RuBee Standard for Long Wavelength Network Protocol", will allow for networks encompassing thousands of radio tags operating below 450 KHz.

The inductive mode of the RuBee™ tag uses low frequencies, 3-30 kHz VLF or the Myriametric frequency range, 30-300 kHz LF in the Kilometric range, with some in the 300-3000 kHz MF or Hectometric range (usually under 450 kHz). Since the wavelength is so long at these low frequencies, over 99% of the radiated energy is magnetic, as opposed to a radiated electric field. Because most of the energy is magnetic, antennas are significantly (10 to 1000 times) smaller than ¼ wavelength or ¹⁄₁₀ wavelength, which would be required to efficiently radiate an electrical field. This is the preferred mode.

As opposed to the inductive radiation mode above, the electromagnetic mode uses frequencies above 3000 kHz in the Hectometric range, typically 8-900 MHz, where the majority of the radiated energy generated or detected may come from the electric field, and a ¼ or ¹⁄₁₀ wavelength antenna or design is often possible and utilized. The majority of radiated and detected energy is an electric field.

RuBee™ tags are also programmable, unlike RFID tags. The RuBee™ tags may be programmed with additional data and processing capabilities to allow them to respond to sensor-detected events and to other tags within a network.

Basic Embodiment

Figure 14:
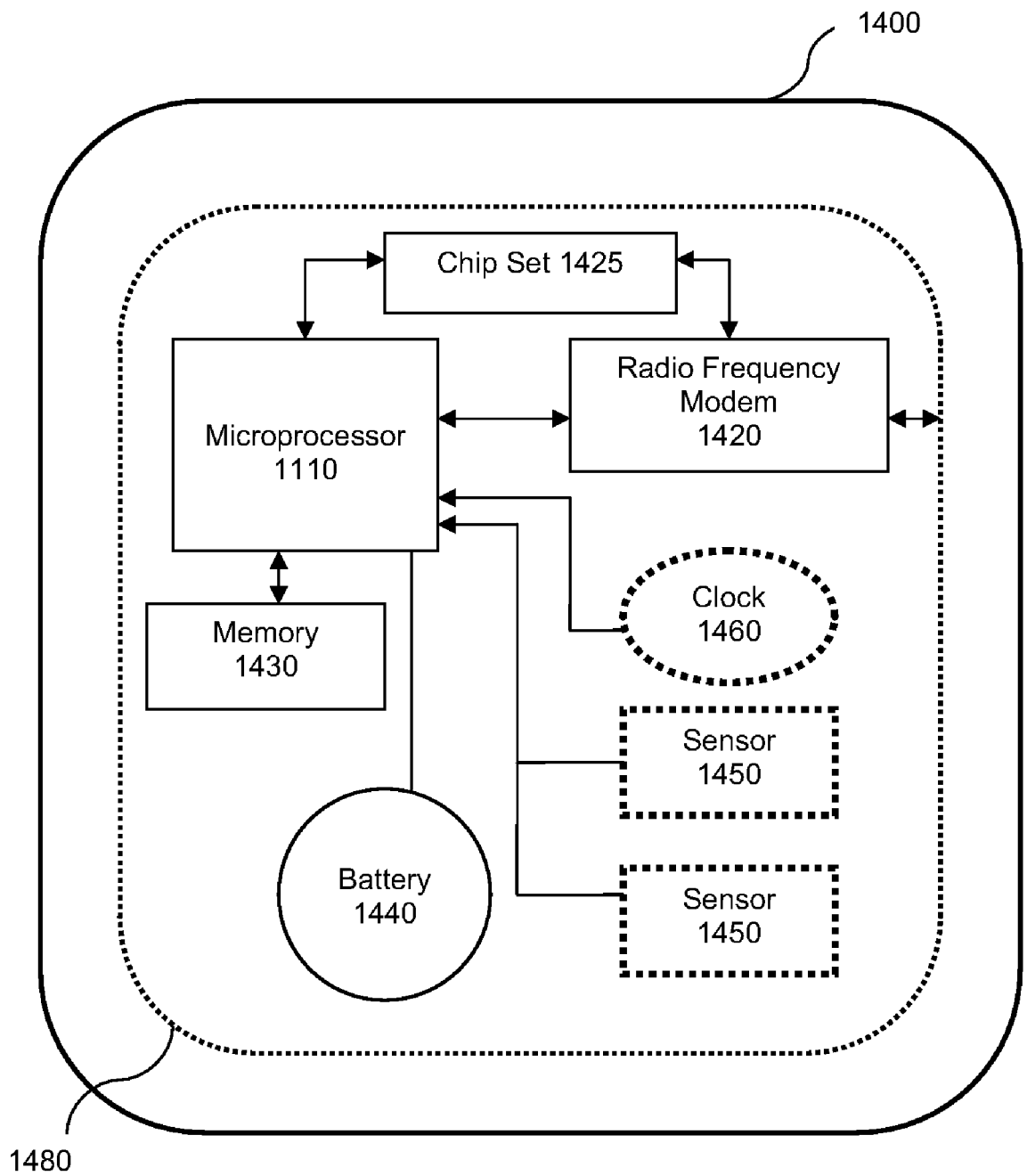
FIG. 14 is a simplified diagram of the contents of a pedigree tag, according to an embodiment of the present invention.

FIG. 14 is a simplified diagram showing the functional components of the p-tag 1400 according to an embodiment of the present invention. The basic components of the tag 100 are: a RuBee™ modem 1420, a RuBee™ chipset 1425, an antenna 1480, an energy source 1440, a microprocessor 1410, and a memory 1430. You will note that the antenna 1480 is shown looped around the inside housing of the tag 1400. This is only one possible embodiment. In other embodiments, the antenna 1480 is a fine-gauge wire that extends outside of the p-tag 1400. In addition to these basic components, the p-tag 1400 may also contain optional components to increase its functionality. These optional components are shown with dashed lines in FIG. 14 and they will be discussed in detail later on in this discussion.

Continuing with the discussion of the basic components, the p-tag 1400 contains a custom RuBee™ radiofrequency modem 1420, preferably created on a custom integrated circuit using four micron CMOS (complementary metal-oxide semiconductor) technology. This custom modem 1420 is a transceiver, designed to communicate (transmit and receive radio signals) through an omni-directional loop antenna 1480. All communications take place at very low frequencies (e.g. under 300 kHz). By using very low frequencies the range of the p-tag 1400 is somewhat limited; however power consumption is also greatly reduced. Thus, the receiver of modem 1420 may be on at all times and hundreds of thousands of communication transactions can take place, while maintaining a life of many years (up to 15 years) for battery 1440. Note that the p-tag 1400 may be sold without the battery 1440.

Operatively connected to the modem 1420 is a RuBee™ chipset 1425. The chipset 1425 is configured to detect and read analog voltages. The chipset 1425 is operatively connected to the modem 1420 and the microprocessor 1410.

The antenna 1480 shown in FIG. 14 is a small loop antenna with a range of eight to fifteen feet. It is preferably a thin wire either wrapped many times around the inside edge of the tag housing, or wrapped around a container. A reader or monitor may be placed anywhere within that range in order to read signals transmitted from the p-tag 1400 or one of the p-tag's optional sensors.

The energy source shown in this example is a battery 1440, preferably a lithium (Li) CR2525 battery approximately the size of an American quarter-dollar with a five to fifteen year life and up to three million read/writes. Note that only one example of an energy source is shown. The tag p-100 is not limited to a particular source of energy, the only requirement is that the energy source is small in size, lightweight, and operable for powering the electrical components.

The p-tag 1400 also includes a memory 1430 and a four bit microprocessor 1410, using durable, inexpensive 4 micron CMOS technology and requiring very low power.

What has been shown and discussed so far is a basic embodiment of the p-tag 1400. With the components as discussed, the p-tag 1400 can perform the following functions: 1) the p-tag 1400 can be configured to receive (via the modem 1420) and store data about the container to which it is attached and/or the network to which it belongs (in the memory 1430); 2) the p-tag 1400 can emit signals which are picked up by a reader, the signals providing data about the container or the contents of the container; 3) the p-tag 1400 can store data in the form of an internet protocol address so that the p-tag's data can be read on the internet.

Note that in this embodiment the electrical components of the p-tag 1400 are housed within the body of the p-tag 1400 and are completely enclosed within the p-tag 1400 when the device is sealed. This makes the p-tag 1400 waterproof and tamperproof.

P-Tag Form Factors.

Referring now in specific detail to the drawings, and particularly FIG. 12, there is shown an illustration of four p-tag form factors, according to embodiments of the present invention.

Figure 12A:
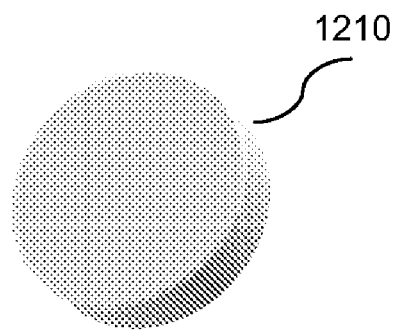
FIG. 12a shows the top p-tag form factor, according to an embodiment of the present invention.
Figure 12B:
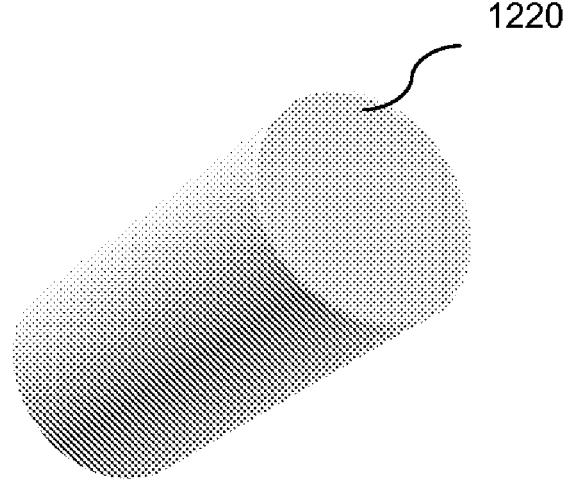
FIG. 12b shows the cap p-tag form factor, according to an embodiment of the present invention.
Figure 12C:
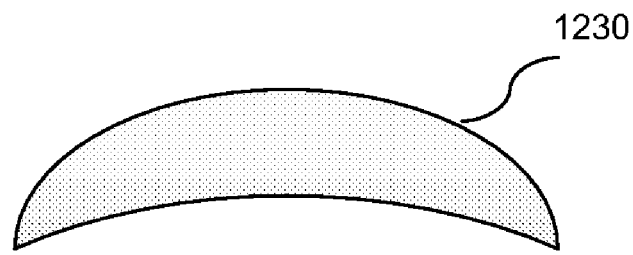
FIG. 12c shows the bottom p-tag form factor, according to an embodiment of the present invention.

FIG. 12a shows the top tag form factor 1210 which fits on a bottle top. The top tag 1210 can be made circular with the exact circumference of a bottle top so that it is unobtrusive when affixed to the top of a bottle. FIG. 12b shows the cap tag form factor 1220 which fits over and covers a bottle top. FIG.

Figure 12D:
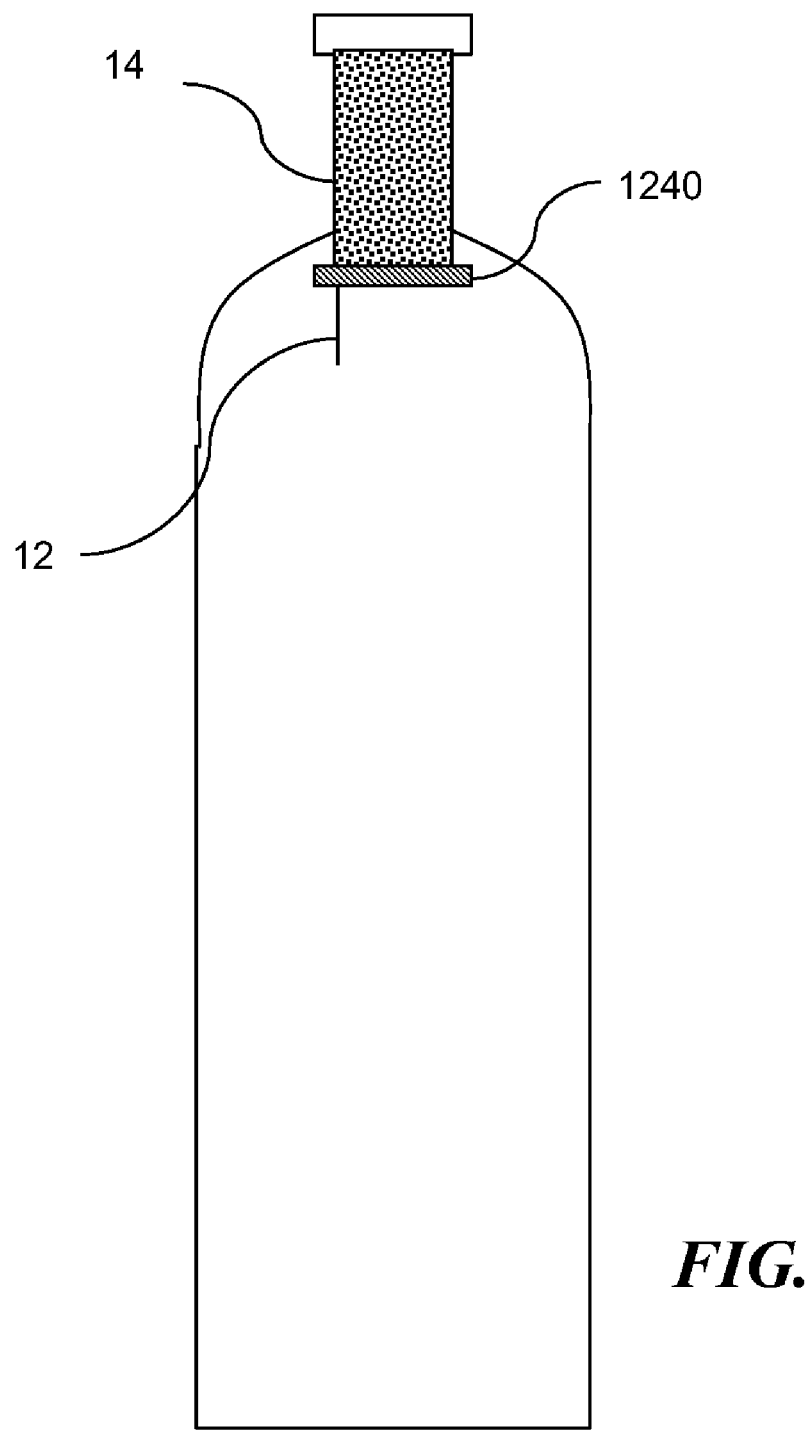
FIG. 12d shows the implanted p-tag form factor, according to an embodiment of the present invention.

12c shows the bottom tag form factor 1230 which is placed on the bottom of a bottle. FIG. 12d shows the implanted p-tag form factor 1240. This embodiment, unlike the other three, is placed inside the container.

In the case of a corked container, the implanted p-tag 1240 is attached to the bottom of the cork 14. For other containers, the p-tag 1240 is simply attached to the inside bottom of the container cap. The antenna 12 in this embodiment is constructed of a material which is non-reactive to wine, such as stainless steel. An implanted p-tag 1240 is possible because the RuBee™ low frequency transmissions are operable through liquids.

The top tag 1210 is the simplest to use, yet it provides the entire range of benefits. These are: 1) pedigree off-board (serial number lookup on Web); 2) full pedigree onboard from data in the tag; 3) high-security protection of bottle contents (bottle cannot be cloned); 4) temperature history; 5) jog history, light history; 6) web interactive; 7) real-time on-the-shelf inventory management; and 8) can guarantee that contents are certified and legitimate.

The cap tag 1220 is lower in cost than the top tag 1210 yet it provides the same range of benefits. The lowest cost solution is the bottom tag 1230. It provides all of the benefits of the other two form factors, with the exception of: 1) high security content; 2) light history; and 3) content certified. With the bottom cap 1230 we cannot guarantee the contents of the bottle since removing the bottle top and/or cork does not affect the data in the bottom tag 1230; whereas, removal of the bottle top is recorded by the data in the other form factors. In addition, the bottom tag 1230 requires software deactivation at time of use whereas the other two form factors (cap tag 1220 and top tag 1210) can be programmed for automatic deactivation when removed.

The implanted p-tag 1240 is really an implanted top tag 1210; therefore, it provides all of the benefits of the top tag 1210. In addition, because the implanted p-tag 1240 comes into direct contact with the contents of the container, it can also provide additional information about the contents such as the PH levels and sugar content. Optional sensors would need to be included in order for the implanted p-tag 1240 to register this type of information.

FIG. 1a shows a side view of the p-tag top tag 1210 as it would appear when placed on a bottle 1. The p-tag 1210 has an antenna 12 and a long wavelength radio tag 11. FIG. 1b shows a top view of the p-tag 1210 wherein the RuBee™ radio tag 11 can be seen. The radio tag 11 has indicators 13 that indicate a conditional status of the product, perhaps displaying the registered temperature, and shake (acceleration) statistics. Optional displays using liquid crystal displays (LCD) or light-emitting diodes (LEDs) could be used with the p-tag 1210.

FIG. 1c shows the bottom of the p-tag 1210 with an optional button 15 to detect pressure to indicate if it has been removed or partially removed from the bottle 1. Although the tag 11 can be programmed for automatic deactivation when removed, it may be preferable for the tag 11 to continue registering data even after removal. For example, it may be important to retain tag activity even in the event that the tag 11 is removed or partially removed so that a de-pressurized bottle 1 is immediately identified and used before spoilage or to date and time-stamp the loss of pressure event and transmit such data.

Other sensors such as temperature and jog sensors could also be included. FIG. 1d shows a bottle 1, representing a standard form factor for a bottle of spirits. Note that this is just a representation of a container which may be advantageously used with an embodiment of the present invention. Other types and shapes of containers may be used with the p-tag and the containers may contain contents other than spirits.

Figure 5:
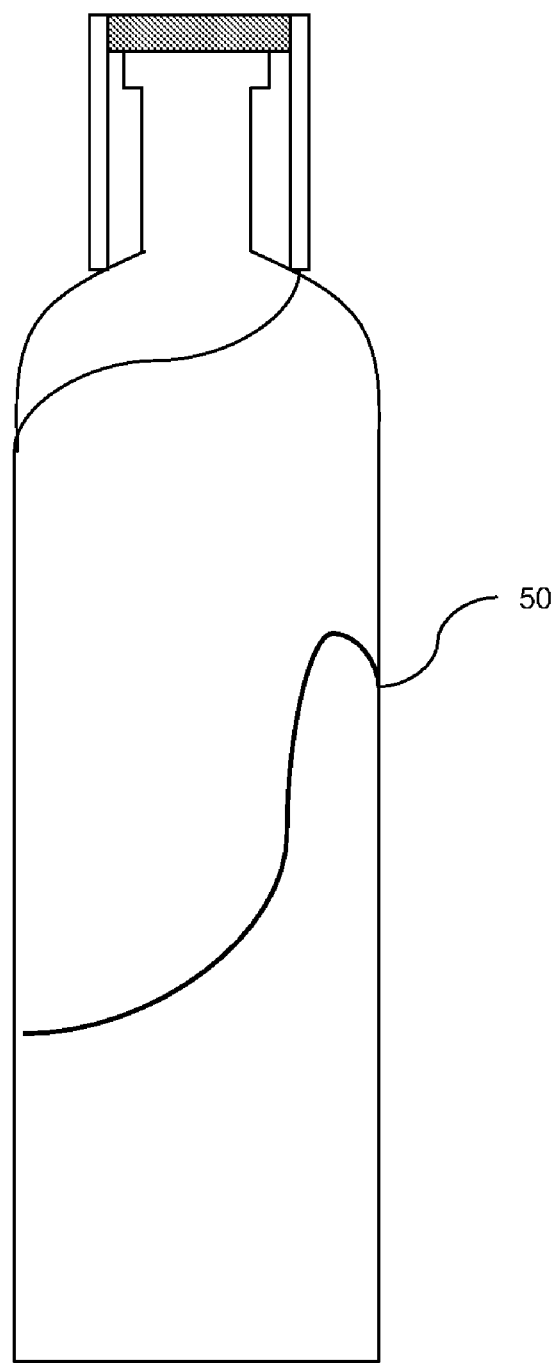
FIG. 5 is an illustration of a p-tag antenna in the form of a coil wrapped around a bottle, according to an embodiment of the present invention.
Figure 6:
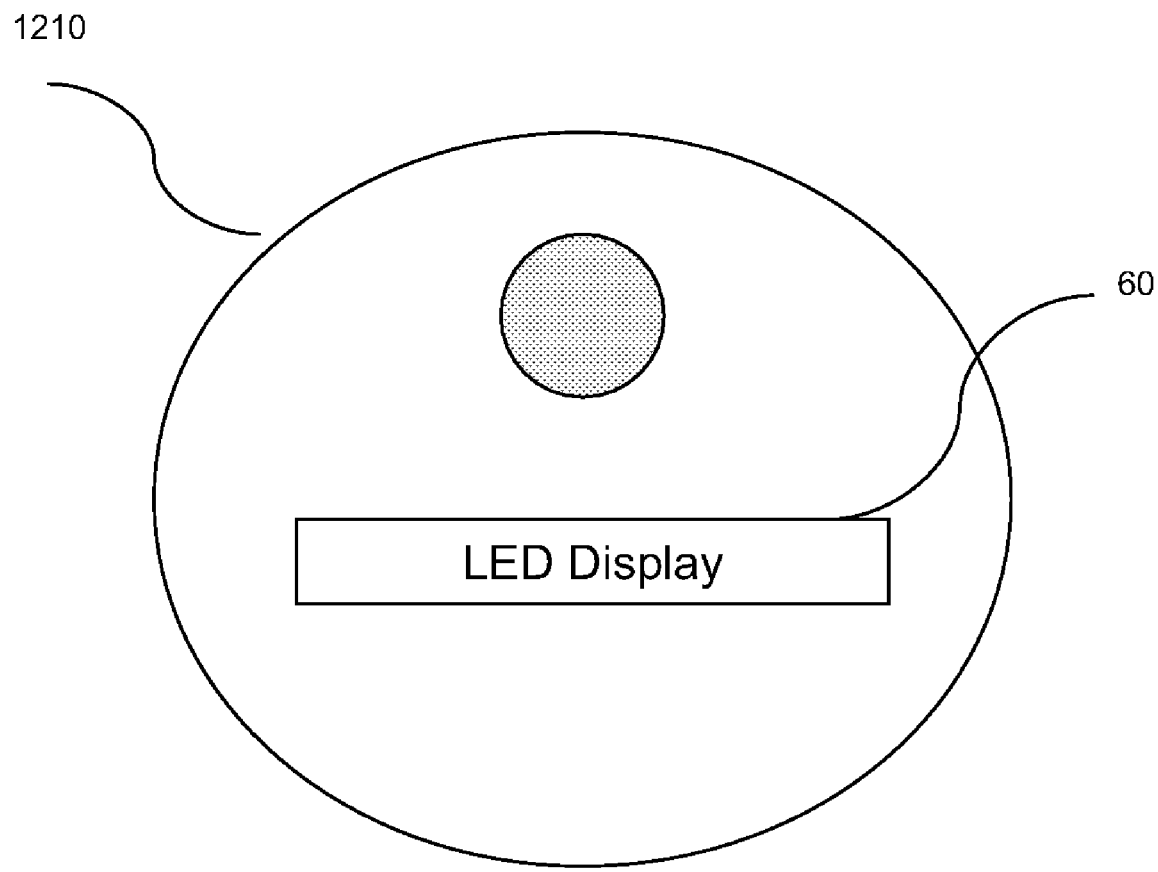
FIG. 6 is an illustration of an optional p-tag display, according to an embodiment of the present invention.

Additionally, the antenna 12 of FIG. 1a may be in the form of a coil 50 wrapped around the bottle as shown in FIG. 5. The wire connected to the coil 50 is preferably very fine (44 gauge) and will be broken when the p-tag 1210 is removed, thus either deactivating the tag 11 or indicating a removal event to the tag 11. In addition, as shown in FIG. 6, the p-tag 1210 may have a display 60 with light-emitting diodes (LED) to provide easy-to-read visual indicators of status.

Referring to FIG. 2 there is shown a bottle 1 with the p-tag 1210 placed over the top of the bottle 1. The p-tag 1210 may be easily affixed to the top of a bottle and held in place by adhesive tape, snap-fit, or other means. Removing the p-tag 1210 from the bottle 1 will either deactivate it entirely or indicate a removal event, thus indicating to a potential consumer that the bottle contents may have been compromised.

Figure 3:
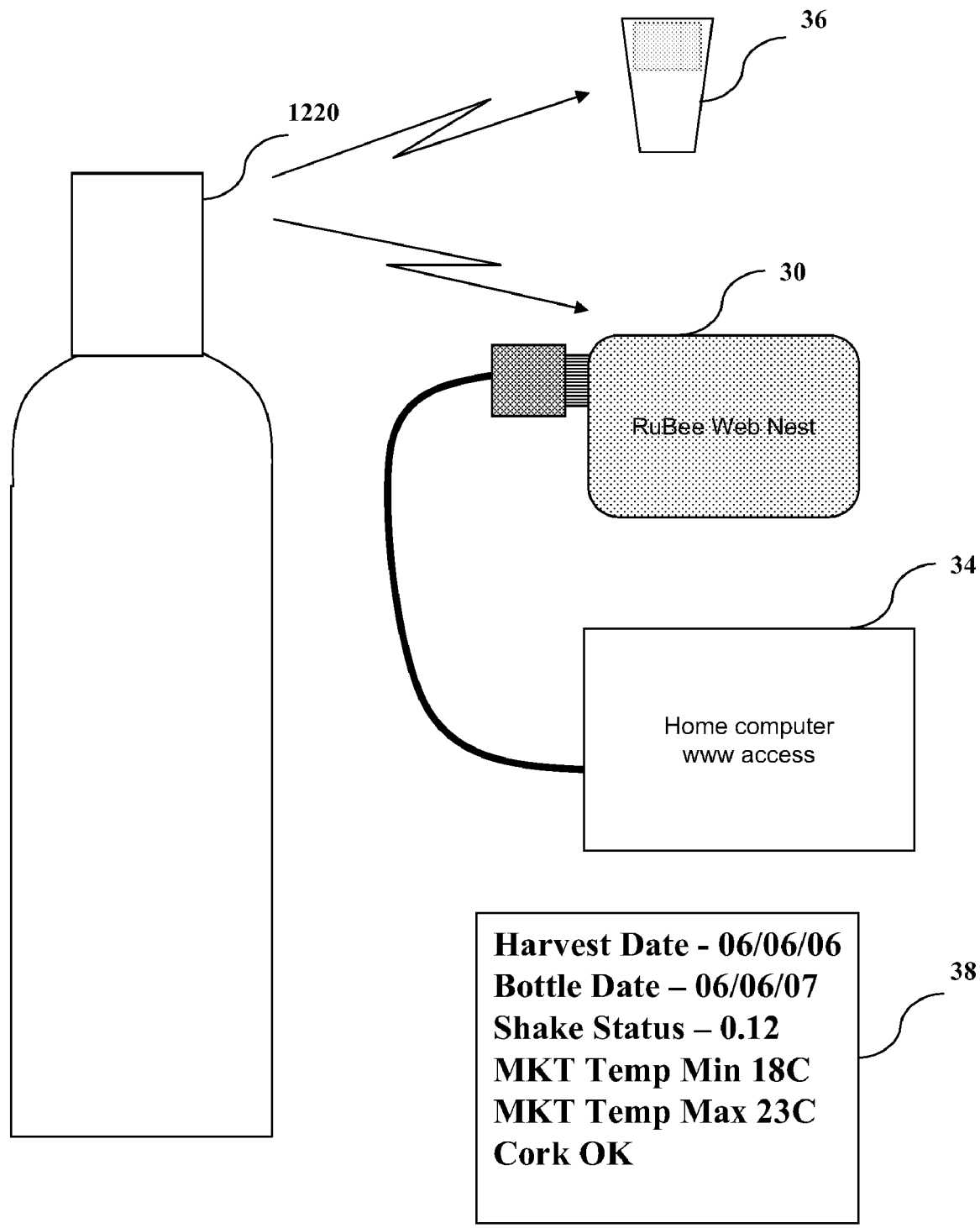
FIG. 3 is an illustration of the p-tag in proximity to a base station, according to an embodiment of the present invention.

In FIG. 3 we show the bottle 1 with an attached cap tag 1220 transmitting low-frequency signals to a base station 30. The cap-tag form factor 1220 provides additional tamper resistance to the bottle. The base station 30 may be connected to a computer 38. As an alternative, a hand-held reader 36 could be used to communicate with the tag 11. The hand-held reader 36 supports bi-directional transmissions. It can both receive and transmit signals to the tag 11. Because the hand-held reader 36 can include an alphanumeric keypad, a consumer or producer could key data into the reader 36 and transmit it directly to the cap tag 1220 (or any of the other tag form factors).

Figure 4:
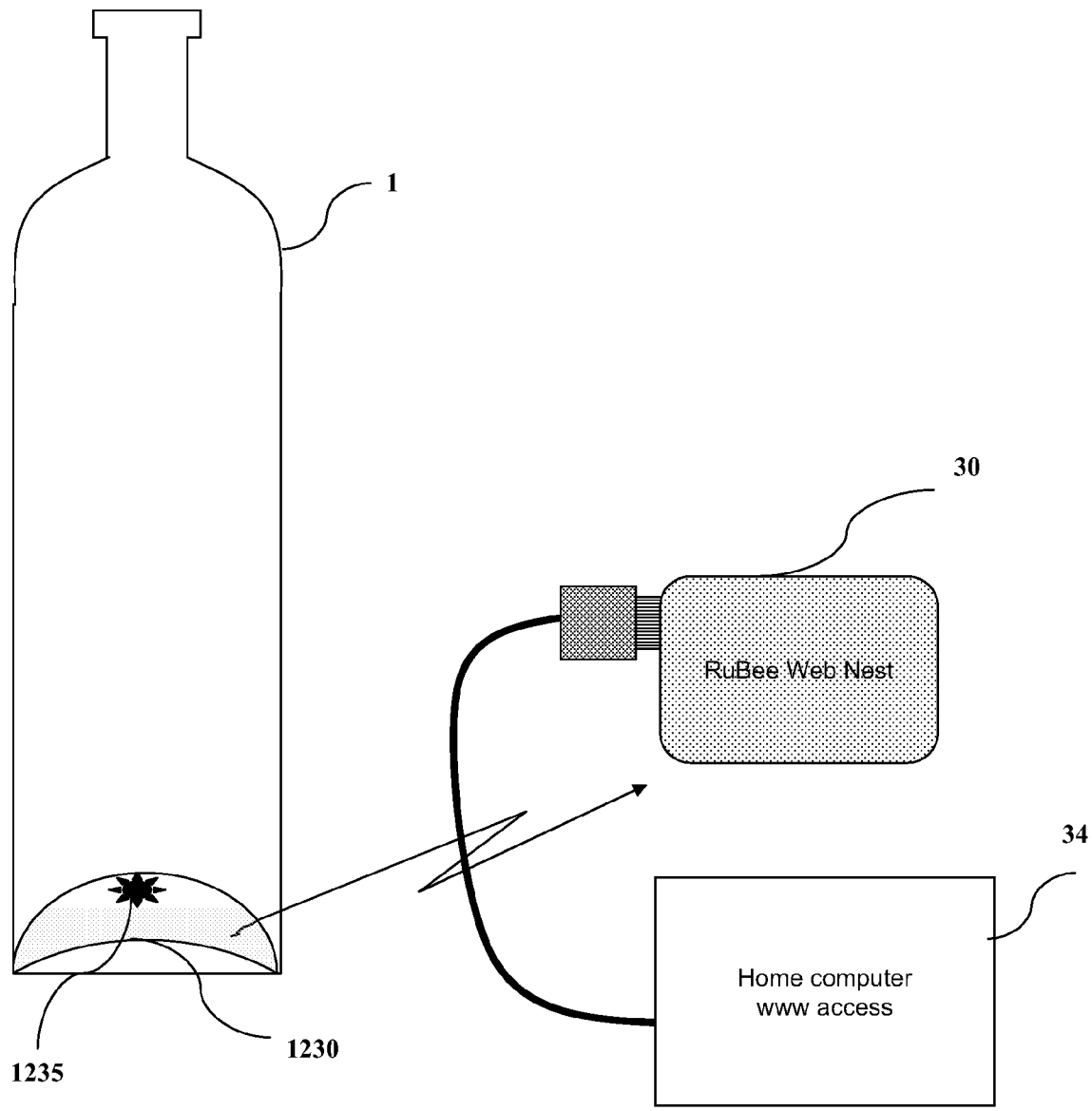
FIG. 4 is an illustration of a bottle with bottom tag, according to another embodiment of the present invention.

Referring to FIG. 4 there is shown the bottom tag 1230 embodiment affixed to the bottom of a bottle 1. The p-tag bottom tag 1230 is lower cost than the cap form factor 1220; yet it still provides: 1) pedigree off-board, i.e. serial number lookup on Web; 2) full pedigree on board (data in the tag); 3) temperature history; 4) jog history; 5) web interactive; and 6) real-time shelf inventory and visibility. The bottom tag 1230 is sized to fit easily into the concave base of a bottle, called a "kick-up" or "push-up" in bottle morphology. The bottom tag 1230 can be simply attached via adhesive means. This embodiment may be preferable to some because it does not alter the appearance of the bottle 1.

In order to determine if there has been tampering, in this case the radio tag 11 in the bottom p-tag 1230 is deactivated by software when read by the end user (consumer). Once the radio tag 11 is deactivated, the bottle 1 can no longer be authenticated. A counterfeiter would not be able to re-sell this bottle 1.

The bottom p-tag 1230 may optionally contain a photodiode 1235. A photodiode is a light detector. In this embodiment, the photodiode 1235 works in photovoltaic mode. In photovoltaic mode, light falling on the diode 1235 causes a current across the device, leading to forward bias which in turn induces "dark current" in the opposite direction to the photocurrent. This is how solar cells work. The photodiode 1235 would pick up any change in reflected/transmitted light from the bottom of the bottle 1. A change in light could indicate that the bottle 1 has been moved and/or opened. This would be logged as tampering. The photodiode 1235 option would work especially well with dark liquids, such as red wines.

P-Tag Visibility Network.

The base station 30 may be connected via USB to a computer 34 with Internet access. When the tag 11 is within range of the base station 30 or reader 36 it is able to transmit its data so that the full pedigree and data contained in the cap tag 1220 may be harvested and transferred to a central location using the RuBee™ protocol. Additionally, a handheld reader 36 could be used to communicate with the tag 11. The range of the RuBee™ tag is covered in U.S. application Ser. No. 11/402,413, "Active Radiating, Low Frequency Sensor Tag and System," from which this application claims priority.

Using the base station 30 or a handheld reader 36, a consumer obtains detailed information regarding the pedigree of the spirit, and the manufacturer obtains point of use information regarding the consumer through the Web. In box 38 we show some of the pertinent information transmitted by the cap tag 1220, such as the harvest date, bottling date, shake status, temperature and cork status. Note that this information may be viewed over the web so that the status of each individual bottle may be quickly determined without having to handle or move the bottle. Each radio tag 11 would be provided with a unique ID to identify it among other tags in the network. This ID could optionally be an internet protocol IPV4 address.

Figure 7:
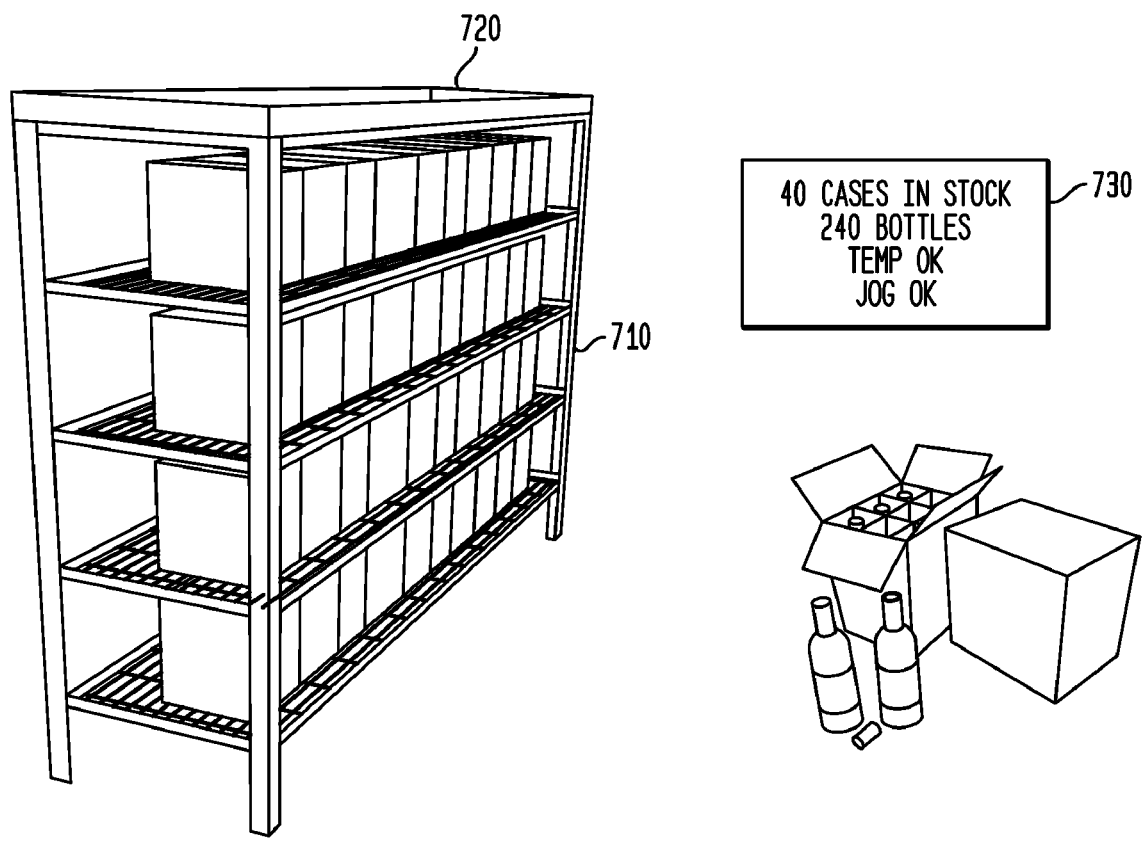
FIG. 7 is an illustration of a RuBee™-enabled shelf for storing wine cases, according to an embodiment of the present invention.

One of the benefits provided by the radio tag 11 is improved inventory management. Referring to FIG. 7 there is shown an illustration of a RuBee™-enabled inventory shelf 710 housing cases of wine. A loop antenna 720 is placed on the top of the shelf 710. The loop antenna 710 may be placed anywhere within range of the base station 30. The radio tags 11 on the bottles may be read without removing the bottles from their cases, straight from the shelf in real-time, providing inventory status as shown in box 730. The radio tags 11 can also be read at the item level, providing information on individual bottles.

Figure 8:
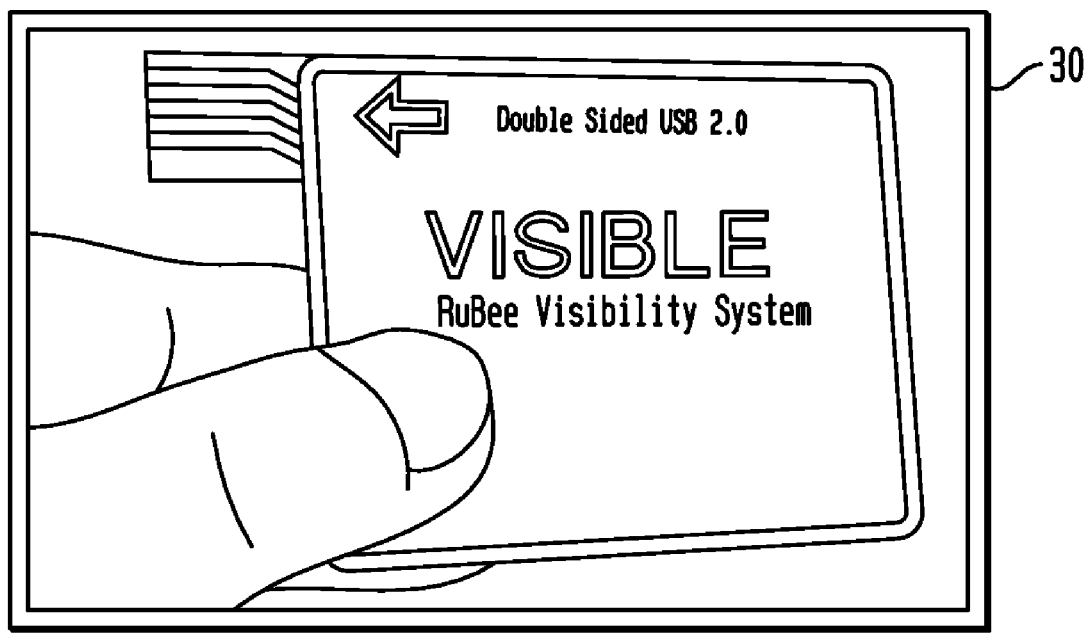
FIG. 8 is an illustration of the base station according to an embodiment of the present invention.

FIG. 8 shows the read/write USB enabled base station 30. As can be seen, the base station according to an embodiment of the present invention follows the form factor of a credit card and can be easily transported. A standard USB cable attaches to the base station 30 and plugs into a computer 34. The computer 34 may be any computing device with a USB port. This includes servers, personal computers, laptops, notebooks, personal digital assistants, and other such devices. Note that optional single-purpose processors, such as a GPS, can be employed within the p-tag network.

Figure 9:
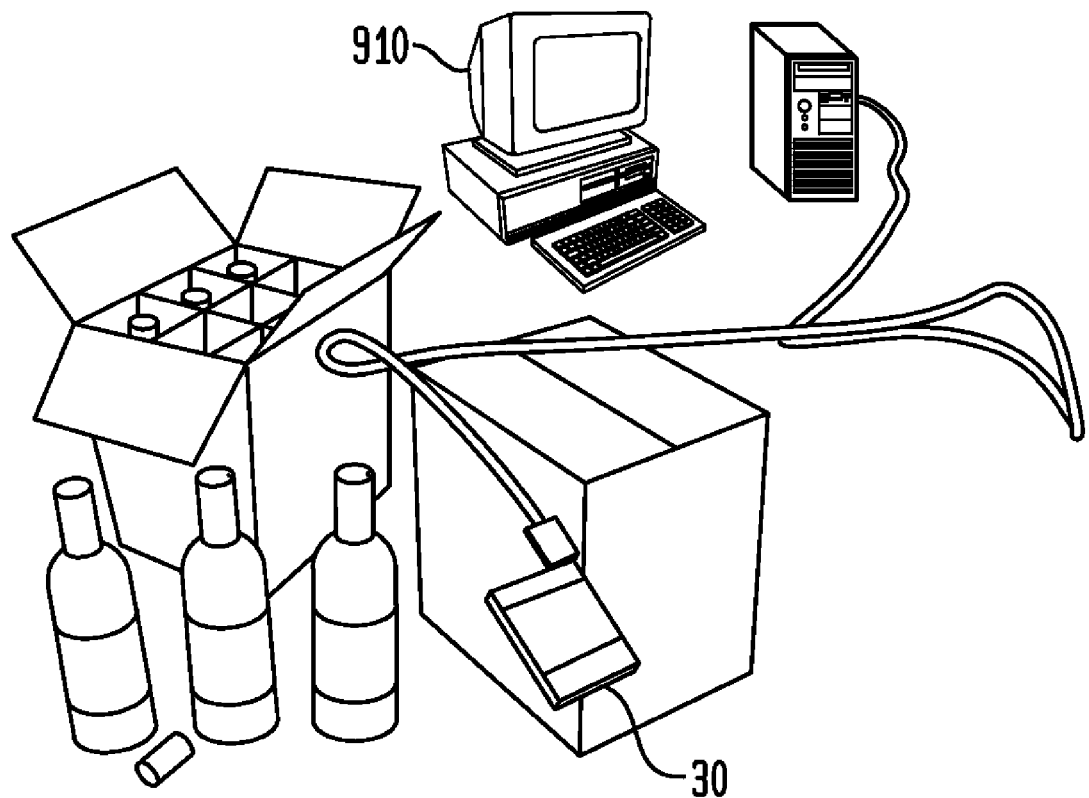
FIG. 9 is an illustration of the base station of FIG. 8 connected to a computer, according to an embodiment of the present invention.

FIG. 9 shows a simplified illustration of a p-tag network 900. The RuBee™ tags 11 (shown as part of the cap tag 1220 in this photo) provide data to the base station 30. The base station 30 is connected via USB cable to a home computer 910. Note that, although shown in close proximity to the home computer 910 in this photo, the bottles need not be in proximity to a computer 910 for their data to be harvested. For example, the bottles may be stored in a wine cellar of a restaurant. The radio tags 11 in the bottle caps 1220 transmit data to a base station 30 or hand-held reader 36 carried by the restaurant manager. At a later point in time, the restaurant manager may take the base station 30 home, plug it into his home computer 910 and upload data transmitted by the caps. The base station 30 may also be used to deactivate bottom tags 1230. Remember that top and cap tags are automatically deactivated when removed.

FIG. 10 shows a listing of data retrieved from a tag 11 which may be of interest to a consumer. FIG. 11 shows data from a tag 11 which may be of interest to a producer.

Method.

Figure 13:
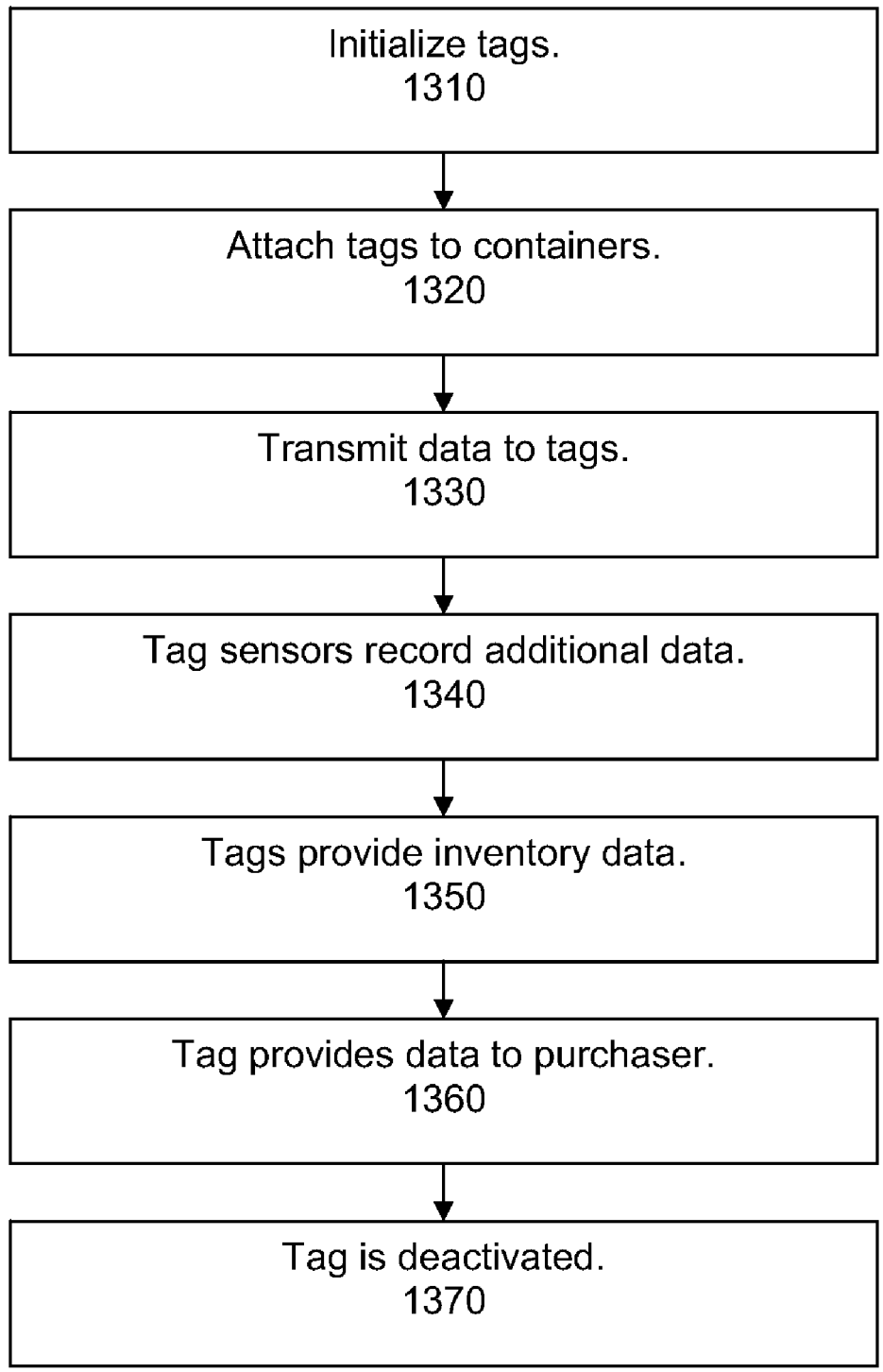
FIG. 13 is a flowchart of a method according to an embodiment of the present invention.

FIG. 13 shows a flow chart of the steps for enabling the p-tag visibility network. In step 1310, the tags 11 to be used are initialized. This consists of activating the tags 11 and assigning each one a unique identifier and a network identifier. Next in step 1320, the tags are affixed to containers, depending on their form factors. Once affixed to the containers, in step 1330 data is transmitted to each tag 11. This data is first entered into a computer and then a base station 30 is used to transmit the data to the tags 11. Optionally, a hand-held reader 36 may transmit data directly to the tag 11. Each tag 11 would contain data about the contents of the bottle 1 to which the tag 11 is affixed.

In Step 1340 optional sensors on the tags 11 record additional information such as temperature and jog information. If loop antennas are used, in step 1350 the tags 11 could provide inventory information while still on a shelf, or in a wine cellar. Next, a customer selects a bottle 1. The producer downloads information from the tag 11 and shows it to the customer, proving the provenance of the wine. The customer is satisfied with the information and purchases the bottle 1. In step 1360 the bottle 1 is stored in the customer's wine cellar where its information is frequently monitored, either by a base station 30 or a hand-held reader 36.

Lastly, in step 1370 the customer removes the cap from the bottle 1, and enjoys the contents. With the top tag 1210, cap tag 1220, and implanted cap tag 1240 form factors, the act of removing the cap would either automatically deactivate the tag 11 or transmit a tampering event. If the bottom tag 1230 form factor is used with a photodiode 1235, the light entering the bottle 1 may transmit a tampering event. Without the photodiode 1235, the bottom tag 1230 would need to be deactivated by software.

Therefore, while there has been described what are presently considered to be the preferred embodiments, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention.

We claim:

1. A method for enabling a pedigree tag visibility network, the method comprising steps of:
    initializing a pedigree tag with a unique identifier and a network identifier;
    affixing the pedigree tag onto a container, depending on the pedigree tag's form factor;
    transmitting data to the pedigree tag;
    monitoring data recorded by the pedigree tag; and
    deactivating the pedigree tag.

2. The method of claim 1 wherein data is transmitted to the pedigree tag from a base station.

3. The method of claim 2 wherein data is transmitted to the pedigree tag from remote data storage location.

4. The method of claim 1 wherein the pedigree tag is affixed to the container using adhesive.

5. The method of claim 1 wherein monitoring the data comprises monitoring data recorded by the pedigree tag in response to sensor alerts.

6. The method of claim 5 further comprising a step of altering data stored in the pedigree tag responsive to the sensor alerts.

7. The method of claim 1 wherein the pedigree tag is deactivated pursuant to a sensor alert.

8. The method of claim 1 wherein the deactivating occurs when the pedigree tag is removed from the container.

9. The method of claim 8 wherein removal prompts automatic deactivation of the pedigree tag, depending on placement of the pedigree tag vis-a-vis the container.

10. The method of claim 1 wherein the monitoring continues even after the pedigree tag has been removed from the container and the deactivating occurs pursuant to a user request.

11. The method of claim 10 wherein removal of the pedigree tag prompts the pedigree tag to record a timestamp of the removal.

12. The method of claim 1 wherein the deactivating comprises software deactivation.

13. The method of claim 1 wherein the monitoring comprises remote web monitoring.

* * * * *